(12) United States Patent
Jones et al.

(10) Patent No.: US 7,010,548 B2
(45) Date of Patent: Mar. 7, 2006

(54) SPARSE AND NON-SPARSE DATA MANAGEMENT METHOD AND SYSTEM

(75) Inventors: M. Tim Jones, Costa Mesa, CA (US); Scott Smallwood, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 50 days.

(21) Appl. No.: 10/609,289

(22) Filed: Jun. 27, 2003

(65) Prior Publication Data
US 2004/0267692 A1    Dec. 30, 2004

(51) Int. Cl.
*G06F 7/06* (2006.01)
(52) U.S. Cl. ............ 707/104.1; 710/28; 370/401
(58) Field of Classification Search .......... 707/3, 707/104.1; 370/401; 714/749; 710/28
See application file for complete search history.

(56) References Cited

U.S. PATENT DOCUMENTS

| | | | | |
|---|---|---|---|---|
| 5,430,727 A | * | 7/1995 | Callon .................. | 370/401 |
| 5,463,777 A | * | 10/1995 | Bialkowski et al. ........ | 707/102 |
| 5,873,078 A | * | 2/1999 | Angle et al. .............. | 707/3 |
| 6,014,659 A | * | 1/2000 | Wilkinson et al. ......... | 707/3 |
| 6,615,383 B1 | * | 9/2003 | Talluri et al. ........... | 714/749 |
| 6,735,647 B1 | * | 5/2004 | Boyd et al. .............. | 710/52 |

* cited by examiner

*Primary Examiner*—Mohammad Ali
*Assistant Examiner*—Sathyanarayan Pannala
(74) *Attorney, Agent, or Firm*—Morrison & Foerster LLP

(57) ABSTRACT

A method and system for tracking data packets that utilizes a tree data structure with a recursive pruning algorithm that collapses the branches of the tree that represent contiguous ranges or regions to maintain a minimally optimum memory size. Each contiguous region is identified by a node, which includes the start and end range of packets. Each node further includes left and right pointer elements, which point to adjacent lower and higher nodes, respectively. When a packet sequence number is not contiguous with any other sequence numbers previously received, a new node is created that contains only a single value range. When a new packet is received that has a contiguous sequence number (i.e., immediately preceding or succeeding sequence number), the original node is updated so as to reflect the new contiguous range. Additionally, if this new contiguous range is contiguous with another node's range, the two nodes are "collapsed" into a new single node containing the new expanded contiguous range. Furthermore, the algorithm can quickly and efficiently determine whether there are any missing packets by simply determining if there is only a single node remaining after a designated "last packet" has been received.

19 Claims, 9 Drawing Sheets

SPARSE AND NON-SPARSE DATA MANAGEMENT METHOD AND SYSTEM

BACKGROUND OF THE INVENTION

1. Field of the Invention

The present invention relates to a method and system for management of data and, more particularly, to a method and system for monitoring and determining whether all the data sent by the sender has been received by the receiver.

2. Description of the Related Art

In computer network systems, data is commonly transmitted in discrete units referred to as data blocks or packets. In accordance with data transmission protocols such as the Internet protocol (IP), transmission control protocol (TCP), small computer system interface (SCSI) protocol, and internet small computer system interface (iSCSI) protocol, for example, control for the transmission and receipt of each block or packet is performed by processing information contained in the "header" of each block or packet. As used hereinafter the term "packet" will refer to a discrete unit of data, including a block of data, or any other unit or discrete quantity of data that is or can be transmitted in accordance with data transmission protocols known in the art.

FIG. 1 illustrates a block diagram of a computer network 10 having server computer 12 having central processing unit (CPU) 14. The server 12 further includes host server memory 16 coupled to the CPU 14 via peripheral component interconnect (PCI/PCIX) bus interface 18. The host memory 16 stores data and programs that are used by the CPU 14 and can comprise a ROM, hard disk drive (HDD), EEPROM, Flash or other types of nonvolatile memory known in the art. It is understood that the server 12 inherently includes other well-known components/devices, such as volatile memory (e.g., RAM, DRAM, SRAM), cache, floppy disk drive, compact disk drive, etc. which are not illustrated in FIG. 1.

The CPU 14 is further coupled to a host bus adapter (HBA) card 20 via the PCI/PCIX interface 18. The HBA card 2O is in turn coupled to a network communications medium 26 (e.g., Internet/world wide web, LAN, WAN, fiber channel, etc.) via a physical connection port 22, also referred to herein as medium access control (MAC) port or interface 22. The HBA 20 further includes a local memory 24, otherwise referred to herein as a network interface buffer (NIB) 24, for storing data handled and processed by a microprocessor (not shown) within the HBA 20.

Generally, HBA's are well-known peripheral devices that handle data input/output (I/O) operations for host devices and systems (e.g., servers). In simple terms, a HBA provides I/O processing and physical connectivity between a host device (e.g., server 12) and one or more external devices 28, which may be a data storage device or a remote personal computer. The external device 28 may be "connected" to the host device via the communications medium 26 using a variety of known "direct attached" or networking technologies, including TCP/IP, Fiber channel, SCSI, iSCSI, VI/IP or FICON. Thus, the communication medium 26 may comprise the world wide web (a.k.a., the "Internet"), a fiber channel fabric, or other known computer networking communications medium (e.g., LAN, WAN, etc.), which operates according to known communication protocols.

When the server 12 is communicating with the external device 28, data packets are transmitted between the server 12 and the external device 28 in accordance with one or more predetermined protocols, depending on the type of communication medium 26 that is employed, to provide "connectivity" (either physical and/or wireless) between the server 12 and the external device 28. For example, if the server 12 is communicating with the external device 28 via the Internet, various protocol "layers" are typically utilized to control, monitor and route the data so that it is reliably and efficiently received by its intended recipient in a useable format. FIG. 2 illustrates some well known protocol layers that are used to format and transmit data between a first device and a second device via the world wide web (a.k.a., "Internet"). As shown in FIG. 2, these various protocols include a physical layer 30 (a.k.a., a medium access control (MAC) layer 30), an IP layer 32, a TCP layer 34, and an iSCSI layer 36.

The medium access control (MAC) protocol 30 is used to provide a physical layer or "data link layer" for Ethernet LAN systems. The MAC protocol encapsulates or "packetizes" data to be transmitted and adds a header to the data (also referred to as the "payload"). The header information contains protocol control information and typically includes at least the following three parts: (1) a destination address, which specifies either a single recipient node (unicast mode), a group of recipient nodes (multicast mode), or the set of all recipient nodes (broadcast mode); (2) a source address, which is set to the sender's globally unique node address; and (3) a protocol type field, which provides service access point (SAP) information to identify the type of network protocol being carried (e.g. the values 0x0800 is used to identify the IP network protocol, other values are used to indicate other network protocols). The MAC protocol 30 also adds cyclic redundancy check (CRC) data at the end of the packet or frame to provide error detection in case line errors (or transmission collisions in Ethernet) result in corruption of the MAC frame. Any frame with an invalid CRC is discarded by the MAC receiver without further processing. The MAC protocol is well known in the art and, therefore, further details regarding additional functions and characteristics of the MAC protocol are not provided herein.

The Internet Protocol (IP) layer 32 is the method or protocol by which data is sent from one computer to another via the Internet. Each computer (known as a host) on the Internet has at least one IP address that uniquely identifies it from all other computers and devices on the Internet. When you send or receive data (for example, an e-mail note or a Web page), the message gets divided into packets. Each of these packets contains both the sender's Internet address and the receiver's address. The IP program layer 32 generates these addresses for each packet of data and stores them in the header of each packet. Based on a destination address, a packet is sent first to a gateway computer that understands a small part of the Internet. The gateway computer reads the destination address and forwards the packet to an adjacent gateway that in turn reads the destination address and so forth across the Internet until one gateway recognizes the packet as belonging to a computer within its immediate neighborhood or domain. That gateway then forwards the packet directly to the receiving computer whose address is specified.

Because a message is divided into a number of packets, each packet can, if necessary, be sent by a different route across the Internet. Packets can arrive in a different order than the order they were sent in. The Internet Protocol just delivers them. It's up to another protocol, the Transmission Control Protocol (TCP) to put them back in the right order. In essence, the IP is a connectionless protocol, which means that there is no continuing connection between the end points that are communicating. Each packet that travels through the Internet is treated as an independent unit of data without any relation to any other unit of data. The task of arranging the packets in the right order at the receiving end is performed by the TCP—the connection-oriented protocol that keeps track of the packet sequence in a message.

The TCP layer 34 comprises a set of rules used along with the IP protocol to send data in the form of message units between computers over the Internet. While IP takes care of handling the actual delivery of the data, TCP takes care of keeping track of the individual units of data (packets) that a message is divided into for efficient routing through the Internet. For example, when an HTML file is sent from a Web server, the TCP program layer in that server divides the file into one or more packets, numbers the packets, and then forwards them individually to the IP protocol program layer. Although each packet has the same destination IP address, it may get routed differently through the network. At the receiving end (e.g., a client computer executing complementary program), TCP reassembles the individual packets and presents them to the client as a single file in accordance with pre-specified conditions that are well known in the art (e.g., time based, setting of a "push flag," etc.).

TCP is known as a connection-oriented protocol, which means that a connection is established and maintained until such time as the message or messages to be exchanged by the application programs at each end have been exchanged. TCP is responsible for ensuring that a message is divided into the packets that IP manages and for reassembling the packets back into the complete message at the other end. The TCP layer 34 does this by generating a TCP sequence number for each packet of data received by the iSCSI layer 36 (discussed in further detail below). At the receiving device, a corresponding TCP program layer 34 receives the packets and reads the TCP sequence numbers to verify that all expected TCP sequence numbers are accounted for.

The small computer system interface (SCSI) protocol is a collection of American National Standards Institute (ANSI) standards and proposed standards that define the operation and architecture of I/O buses that provide connectivity between storage subsystems or devices and host systems (e.g., servers) through host bus adapters (HBAs). Originally intended primarily for use with small (desktop and desk-side workstation) computers, SCSI has been extended to serve most computing needs, and is arguably the most widely implemented I/O bus protocol in use today.

The iSCSI protocol layer 36 is the Internet SCSI protocol layer, which is an IP-based storage networking standard for linking data storage facilities and other devices over the Internet, developed by the Internet Engineering Task Force (IETF). By carrying SCSI commands over IP networks, iSCSI is used to facilitate data transfers over intranets and to manage storage over long distances. The iSCSI protocol is among the key technologies expected to help bring about rapid development of the storage area network (SAN) market, by increasing the capabilities and performance of storage data transmission. Because of the ubiquity of IP networks, iSCSI can be used to transmit data over local area networks (LANs), wide area networks (WANs), or the Internet and can enable location-independent data storage and retrieval.

In accordance with the iSCSI protocol layer 36, when an end user or application sends a request, the operating system of the end user computer generates the appropriate SCSI commands and data request, which then go through further TCP, IP and encapsulation processing, as discussed above. As further discussed above, a packet header is added by the MAC protocol layer 30 before the resulting IP packets are transmitted over an Ethernet connection (e.g., MAC physical layer). When a packet is received, it is decrypted (if it was encrypted before transmission), and disassembled, separating the SCSI commands and request. The SCSI commands are sent on to the SCSI controller, and from there to the SCSI storage device. Because iSCSI is bi-directional, the protocol can also be used to return data in response to the original request. iSCSI is a well known protocol for managing the transmission of data over IP networks. A number of vendors, including Cisco, IBM, and Nishan have introduced iSCSI-based products (such as switches and routers). Other methods, such as Fibre Channel over IP (FCIP) are also known.

The iSCSI protocol layer 36 also plays an important role in ensuring that all the data packets transmitted by a source application program is received by the intended receiving device at the specified destination address. The iSCSI layer 36 does this by generating an an iSCSI sequence number for each set of data that is to encapsulated in a single packet, wherein one or more packets comprise a "message" or complete set of data transmitted by an application program executed by the source device (e.g., server 12). A respective iSCSI sequence number, along with the TCP sequence number mentioned above, is contained in the header portion of each packet. The iSCSI sequence number provides additional assurance beyond that provided by the TCP sequence number by ensuring that all packets that were intended to be transmitted by an application program are in fact received by the receiving device at the destination address. The TCP sequence number alone cannot ensure this because the TCP program layer 34 sequentially assigns a TCP sequence number to each packet of data as it is received from the iSCSI layer, not knowing (and not caring) whether some packets failed to be successfully forwarded by the iSCSI layer 36 to the TCP layer 34.

FIG. 3 illustrates a block diagram representation of a data packet 40. The packet 40 includes a payload portion 42 which contains the user data being transmitted to the receiving device. The packet 40 further includes a header portion 43, which includes an IP header portion 44, a TCP header portion 45 and an iSCSI header portion 46. As discussed above, the IP header portion 44 includes the source and destination IP addresses, the TCP header portion 45 includes the TCP sequence number, and the iSCSI header portion 46 includes the iSCSI sequence number. It is understood that other data may be contained in these header portions as is necessary to carry out various transmission control and tracking functions, and functions such as timing, etc., that are known in the art in accordance with these various protocols. The packet 40 further includes a CRC data portion 48 appended to a tail end of the packet 40. Such CRC data portions and their functionality are well known in the art.

When the packet 40 is received by a receiving device, a corresponding TCP layer program 34 executed by the receiving device verifies that all expected TCP sequence numbers are accounted for. Similarly, a corresponding iSCSI layer program 36 verifies that all expected iSCSI sequence numbers are accounted for. The TCP sequence numbers ensure that no data was lost during transmission over the Internet 26, while the iSCSI sequence numbers ensures that no data was lost during iSCSI layer 36 processing. For example, the TCP layer 34 expects to receive TCP sequence numbers in order. Otherwise, the received packets are held in the TCP layer until contiguous packets with contiguous TCP sequence numbers are received. Peer applications, such as iSCSI, can transmit its packets in any order. Thus, for example, while the iSCSI layer may transmit packets with sequence numbers i1, i2, i4, i6, i3 and i5, these packets would be labeled in the TCP layer s t1, t2, t3, t4, t5 and t6.

Therefore, because the iSCSI layer can transmit packets in any order, some mechanism is needed to keep track of what has been received and if any gaps exist.

Since packets of data can arrive out of order at the receiving device, each packet must be tracked to determine whether all expected packets in a "set" (e.g., a complete message) has been safely received. What is interesting about this problem is that initially it's a sparse data management problem that evolves into a non-sparse data management problem. At the beginning of the data transmission process, the amount of data received by the receiving device is "sparse." However, as more and more packets are received, the amount of data becomes "non-sparse." Previously existing methods for determining whether all the data has actually been received include the use of "linked lists" or "bit-vectors." These existing techniques that utilize either a linked list or a bit vector to keep track of received data do not manage both sparse and non-sparse data efficiently.

A linked list allocates memory space for each element it is "tracking" wherein each element is typically referred to as a "linked list element" or "node." The list gets its overall structure by using pointers to connect all its nodes together like the links in a chain. Each node contains two fields: a "data" field to store whatever element type the list holds (e.g., sequence no.) and a "next" field which is a pointer used to link one node to the next node. Each node is allocated an address in the memory. As each packet of data is received by the receiving device (e.g., a HBA), firmware or software executed by a processor in the receiving device creates a new node, which contains the packet sequence no. (e.g., iSCSI sequence no.) and a pointer value that points to the next closest node in the linked list. When a new node is created, the software or firmware determines where in the linked list the new node must be inserted and thereafter adjusts pointer values for adjacent nodes as necessary. A linked list can efficiently store received sequence numbers, if the packets to be tracked are contiguous. However, searching the linked-list requires linear searching of the list and, therefore, is not well-suited for high-speed or real time input/output (I/O) data processing applications. Additionally, when a large number of packets are received the memory requirements for storing a node for each packet can become significant.

Bit vectors are also well known in the art. Instead of creating a node for each packet sequence number, bit vectors allocate a bit in memory space for each sequence number. As each expected packet sequence number is received by the receiving device, firmware or software executed by the receiving device sets a corresponding bit in the bit vector to indicate that the corresponding packet has been received. Since this technique requires a bit for every packet to be tracked, it requires a potentially large memory allocation. Additionally, since each bit must be read to determine whether all packets are accounted for, the use of bit vectors can be relatively slow and not well-suited for high-speed, high-bandwidth I/O processing applications.

Thus, there is a need for a more efficient and faster method and system for managing data so as to keep track of data packets received by a receiving device and indicate when one or more packets are missing. Furthermore, there is a need for a method and system than can efficiently monitor and manage the receipt of data when it is sparse as well as when it is non-sparse.

BRIEF SUMMARY OF THE INVENTION

The present invention addresses the above and other needs by providing a method and system that keeps a record of initially sparse data that in the end becomes non-sparse. Numerous algorithms exist for sparse-data management, but none that efficiently support the same data being non-sparse. The algorithm of the present invention does this in a way that utilizes a minimal set of resources and provides an efficient method to maintain the data in a tree data structure. Additionally, in one embodiment, the invention automatically minimizes storage requirements by pruning a binary tree of contiguous data, since each node in the tree represents a range of data, instead of a data point.

In one embodiment of the present invention, a tree data structure (e.g., binary tree) is utilized with a recursive pruning algorithm that collapses the branches of the tree, which represent contiguous ranges or regions to maintain a minimally optimum memory size. Each contiguous region is identified by a node, which includes the start and end range of packets. Each node further includes left and right pointer elements, which point to adjacent lower and higher nodes, respectively. When a packet sequence number is not contiguous with any other sequence numbers previously received, a new node is created that contains only a single value range. When a new packet is received that has a contiguous sequence number (i.e., immediately preceding or succeeding sequence number), the original node is updated so as to reflect the new contiguous range. Additionally, if this new range is contiguous with another node's range, the two nodes are "collapsed" into a new single node that contains the new expanded contiguous range.

DETAILED DESCRIPTION OF THE PREFERRED EMBODIMENTS

The invention is described in detail below with reference to the figures, wherein like elements are referenced with like numerals throughout. As discussed below, the invention is described in the context of receiving data packets formatted in accordance with TCP/IP and iSCSI protocols, wherein each packet contains header information that includes an iSCSI sequence number for enabling firmware and/or software executed by the receiving device (e.g., a HBA) to keep track of received data packets. However, it is understood that the invention is not limited to these exemplary data communication protocols and may be utilized to manage data in the context of various other communication and data processing protocols known in the art.

Figure 1:
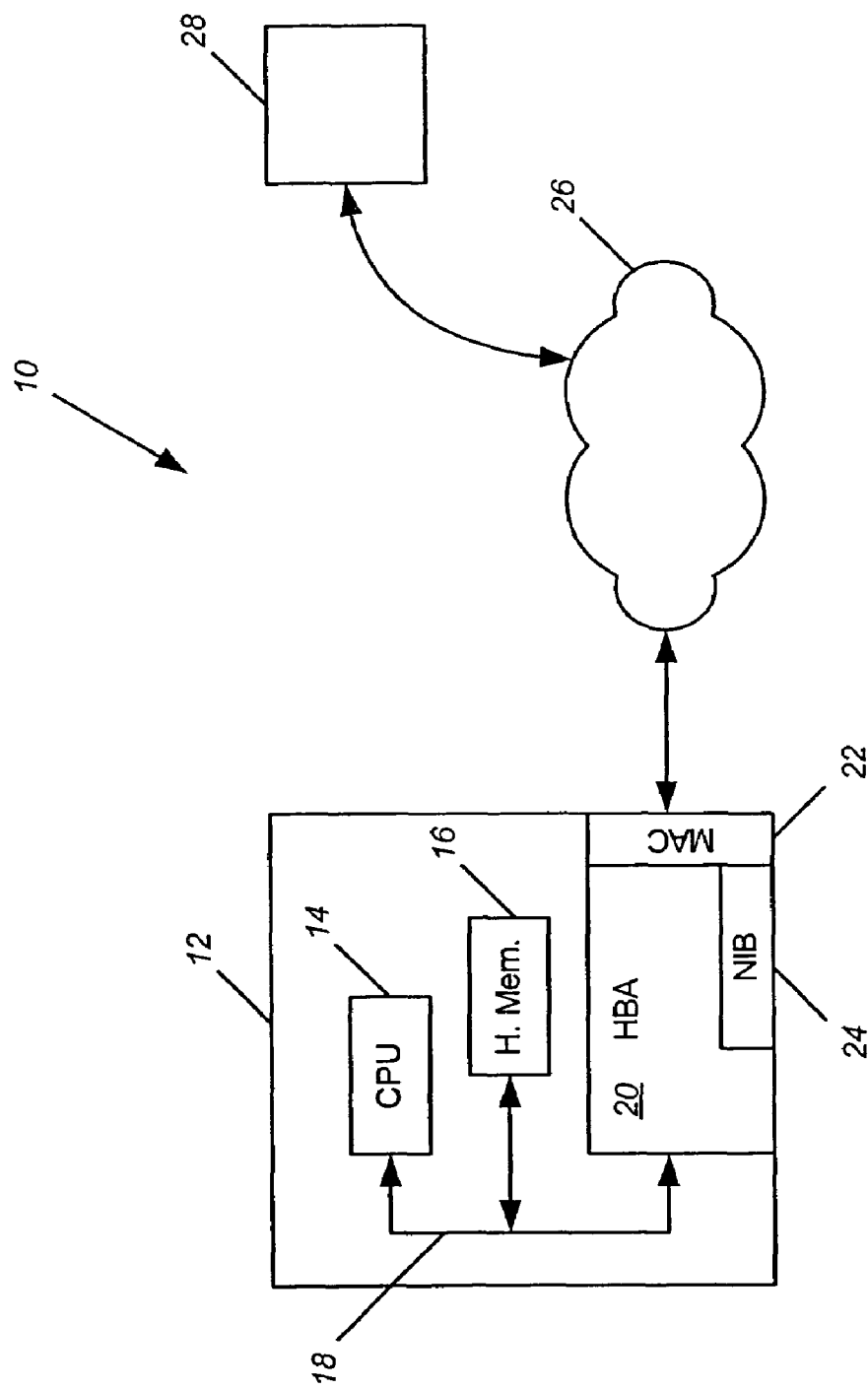
FIG. 1 illustrates a block diagram of a prior art system that includes a server computer coupled to a HBA that communicates with other devices via a computer network medium.
Figure 2:
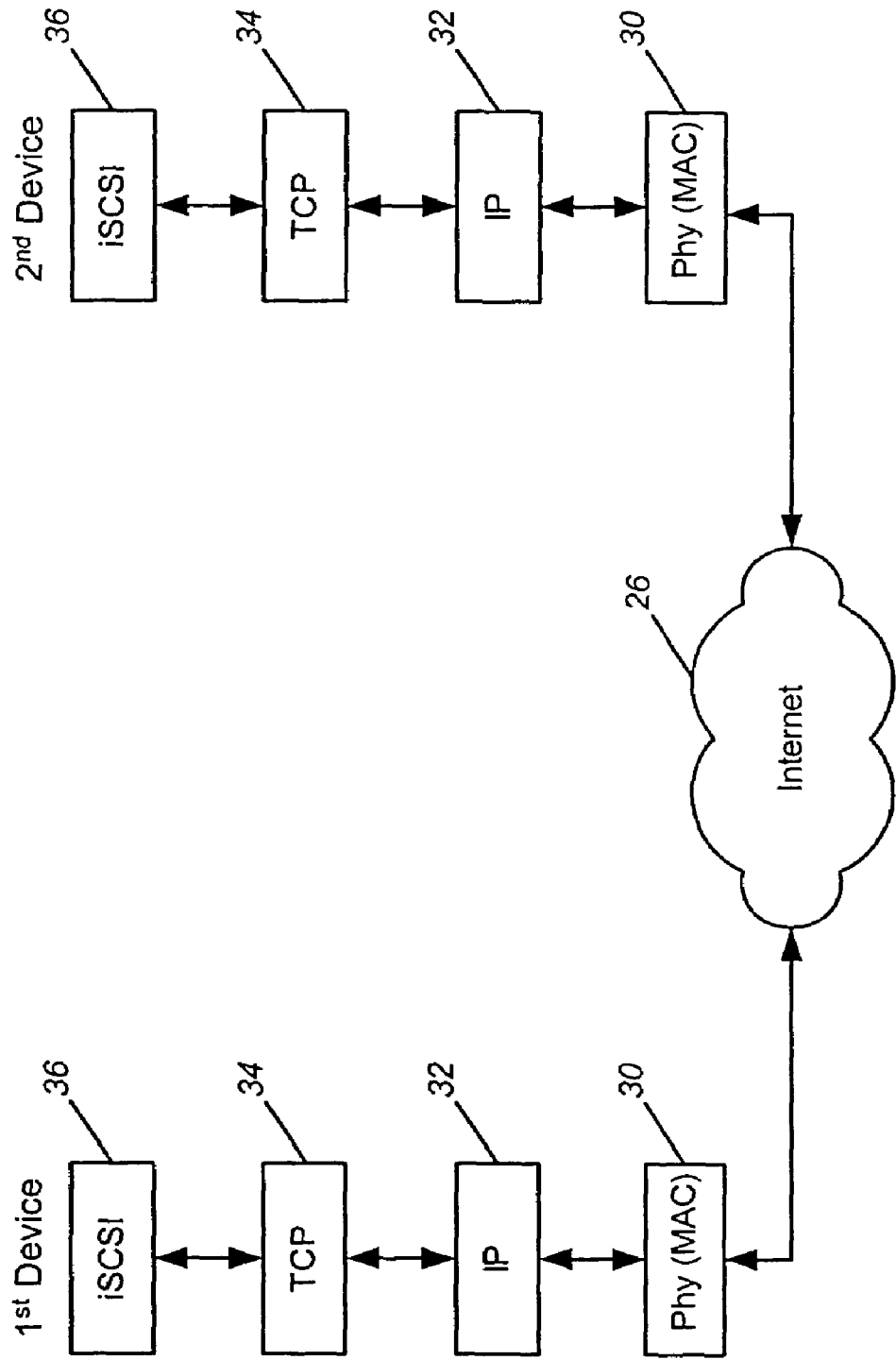
FIG. 2 illustrates a block diagram representation of various data processing protocol layers that are utilized to format and control the transmission and reception of data over the Internet.
Figure 3:
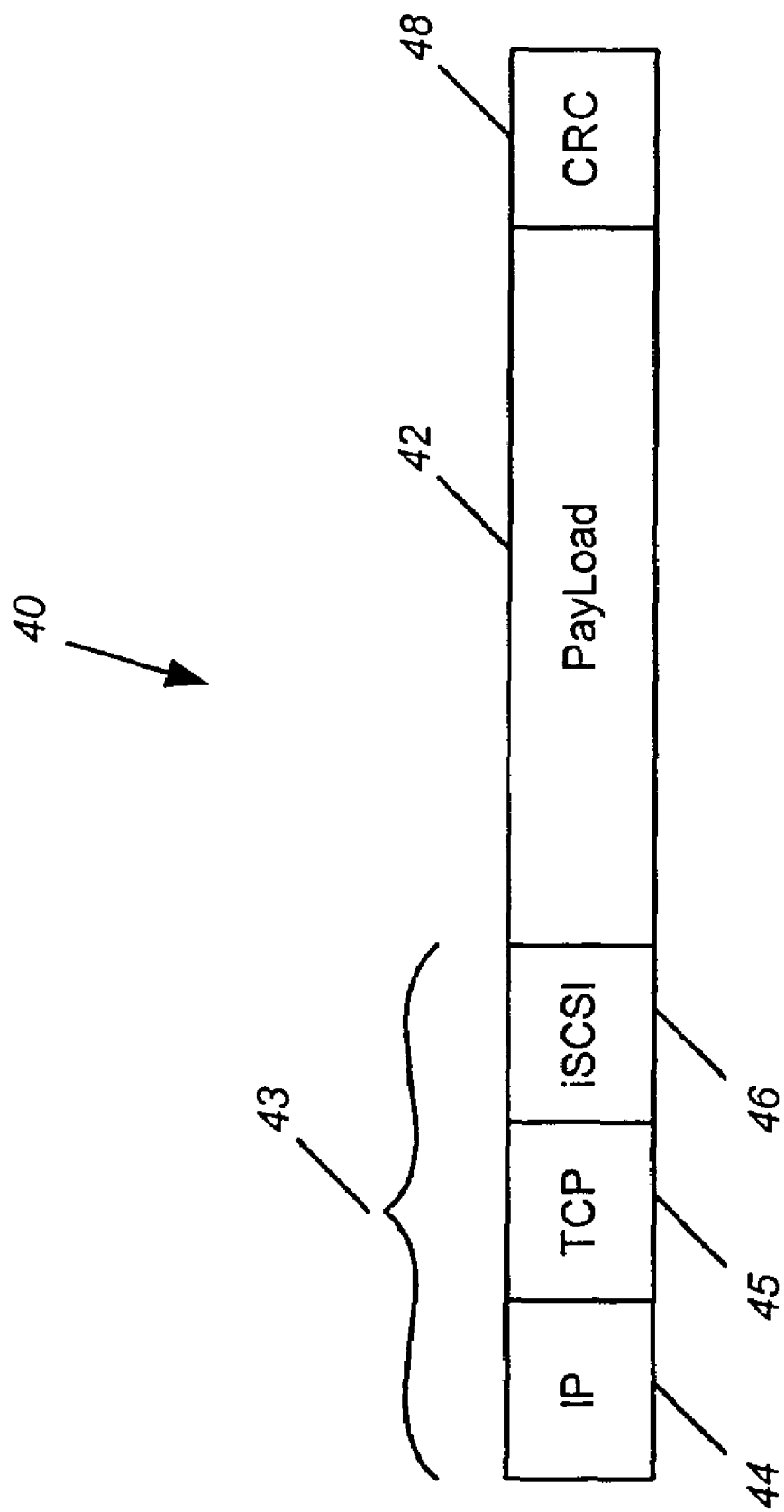
FIG. 3 illustrates a representative diagram of a data packet that is transmitted over the Internet.
Figure 4A:
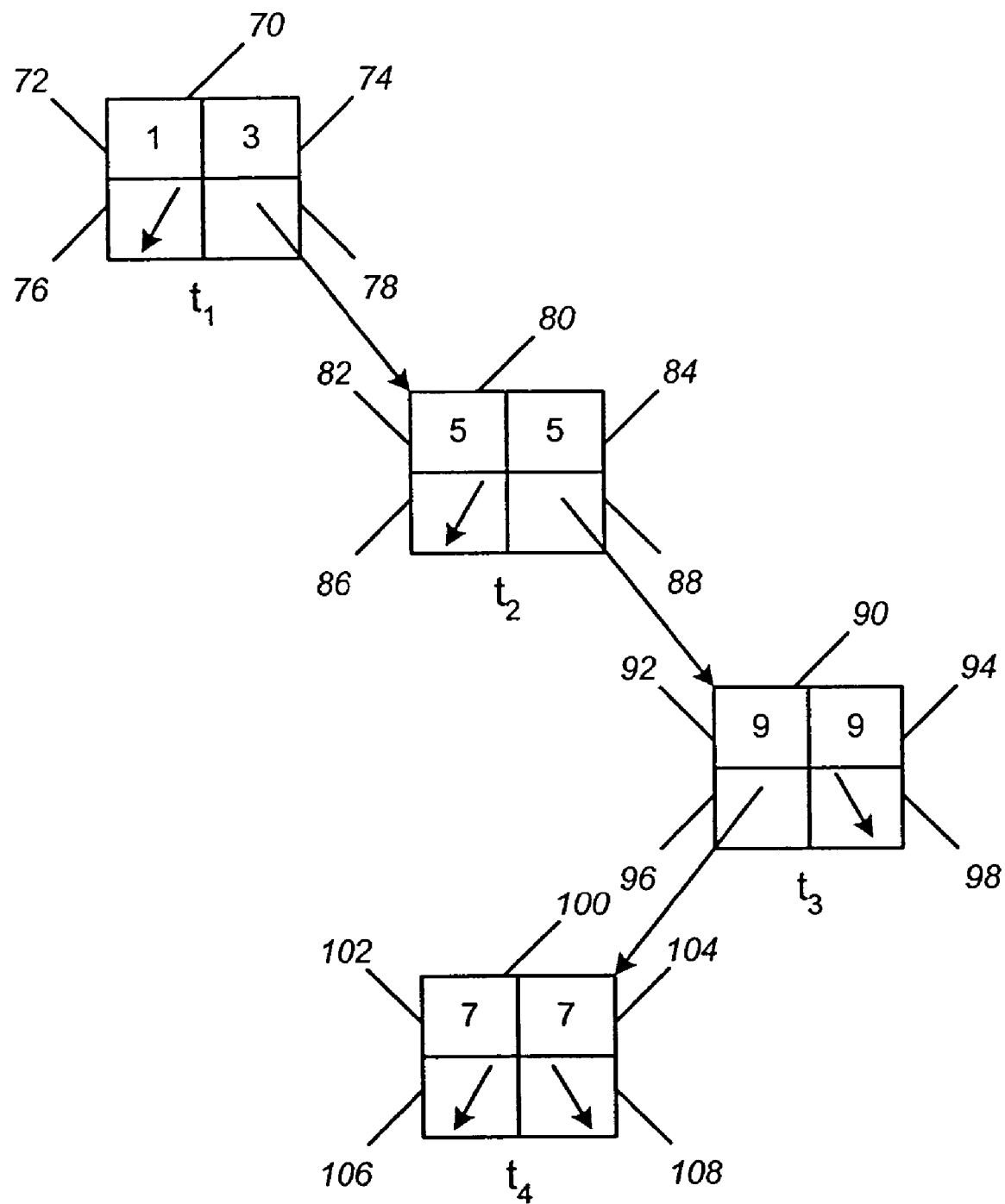
FIGS. 4A–4H illustrate exemplary nodes of a binary tree for tracking received data packets, in accordance one embodiment of the present invention.

FIG. 4A illustrates a simple binary tree having nodes or "leafs" that represent iSCSI sequence number ranges of 1–3, 5, 7 and 9. As shown in FIG. 4A, which is only an exemplary scenario, three packets having iSCSI sequence numbers 1, 2 and 3, respectively, are first received by the receiving device (e.g., HBA 20 (FIG. 1)). In a preferred embodiment, software and/or firmware executed by a microprocessor (not shown) within the HBA 20 reads the sequence numbers from the header of each packet and, thereafter, performs the various operations discussed below. Since the sequence numbers are contiguous, the receipt of these first three packets results in the creation of a first node 70 representative of the range 1–3. The first node includes a lower boundary field 72 and an upper boundary field 74 which indicates the boundaries of a contiguous range of sequence numbers. The first node 70 also includes a left pointer field 76 and a right pointer field 78 for pointing to nodes representative of lower and higher value sequence numbers/ranges, respectively.

Next, in our exemplary scenario, a packet containing a sequence number of "5" is received by the receiving device. This sequence number is not contiguous with the range contained in the first node 70 and, therefore, a new node 80 is created having a lower boundary field 82 and upper boundary field 84, each containing the value of "5." Thus, the contiguous range contained in the new node 80 is the single value range of "5." Since node 80 contains the next highest non-contiguous sequence number range with respect to the first node range of "1–3," the right pointer field 78 points to the second node 80. The binary tree of the present invention, and its respective nodes as described herein, comprise a data structure which is stored in a memory (not shown) located in, or accessible by, the receiving device (e.g., HBA 20 of FIG. 1). It is understood that this memory may be any type of suitable memory known in the art, such as a RAM, DRAM, SRAM, etc.

Next, a packet containing a sequence number "9" is received. A new node 90 is created having lower and upper boundary fields 92 and 94, respectively, which represent the single value range of "9." The new node 90 is linked to the previous node 80 and, hence, node 70, because the right pointer field 88 of node 80 points to the new node 90. Next, a new packet containing the sequence number "7" is received and a new node 100 is created having lower and upper boundary fields 102 and 104, respectively, containing the value "7" and left and right pointer fields 106 and 108, respectively. The new node 100 is linked to node 90 because the left pointer field 96 of node 90 contains a value that points to the new node 100.

Figure 4B:
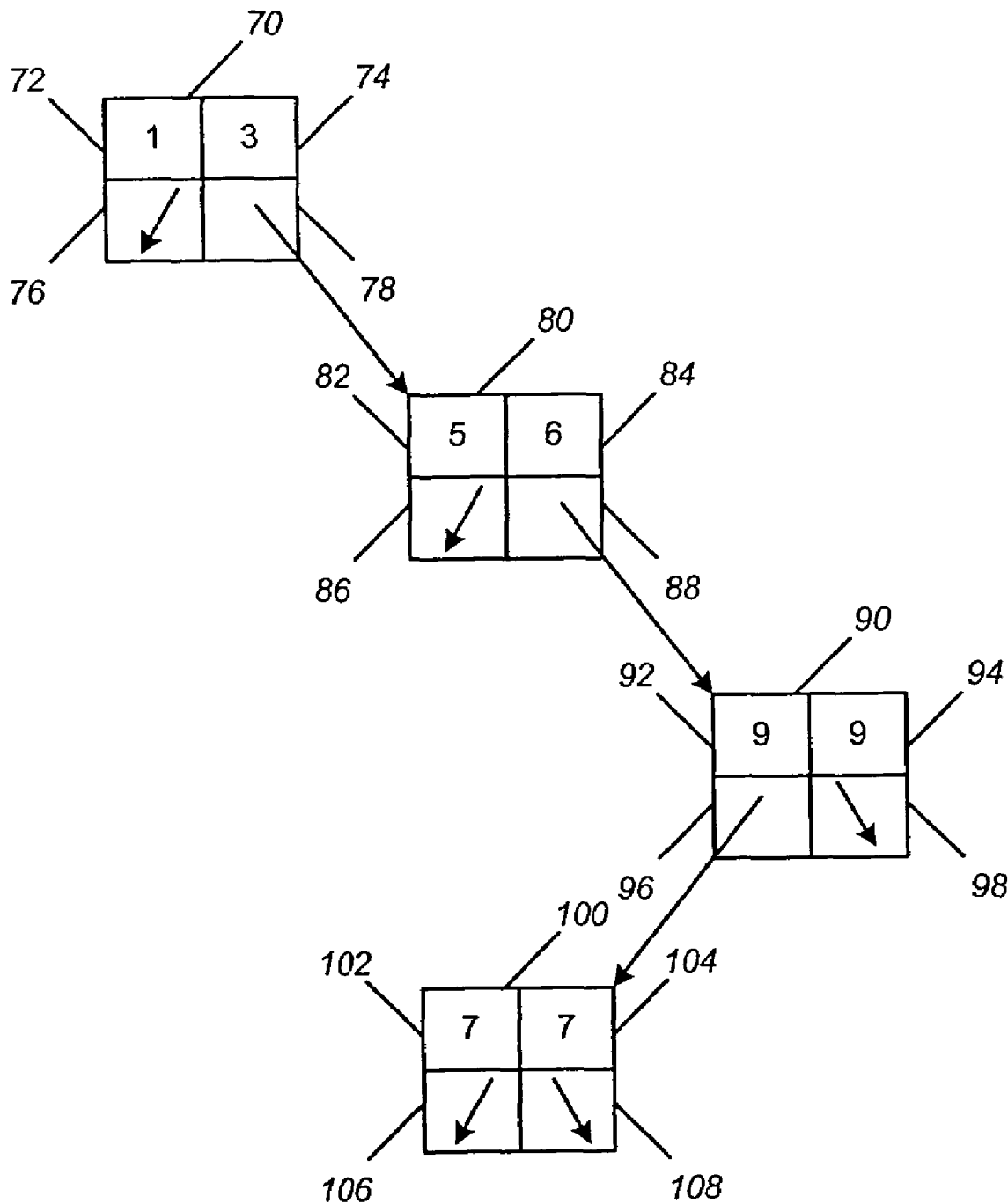
Figure 4C:
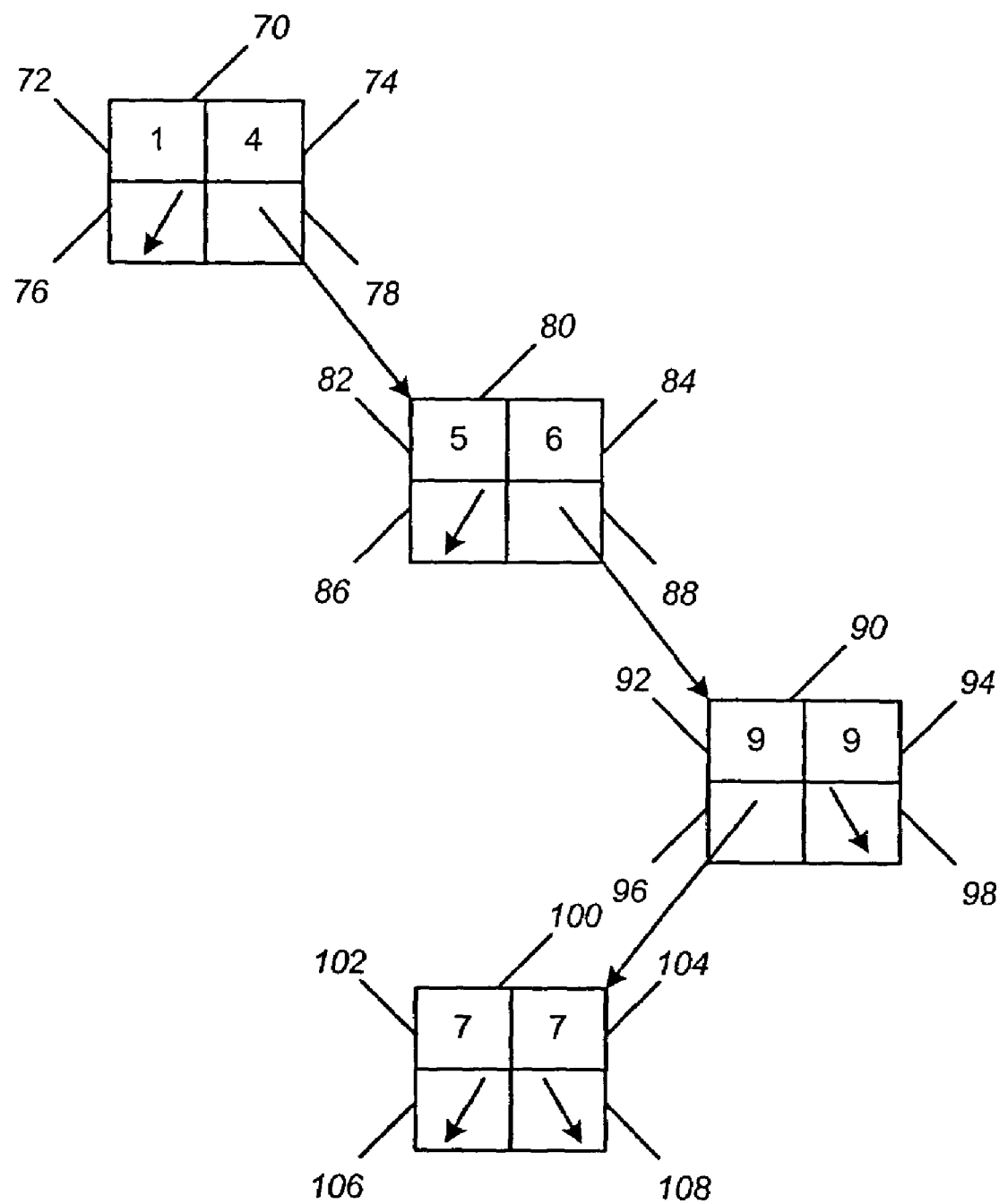

FIG. 4B illustrates the nodes of FIG. 4A, after a new packet containing sequence number "6" is received by the receiving device. Since the new sequence number "6" is contiguous with the range "5" contained in the node 80, node 80 is updated so that its upper boundary field 84 reflects the new contiguous sequence number "6." Alternatively, the method and system of the invention can update the lower boundary field 102 of node 100, instead of upper boundary field 84. Next, as illustrated in FIG. 4C, a new packet with sequence number 4 is received. Therefore, the upper boundary field 74 of node 70 is updated to reflect a new contiguous range of 1–4 for that node.

Figure 4D:
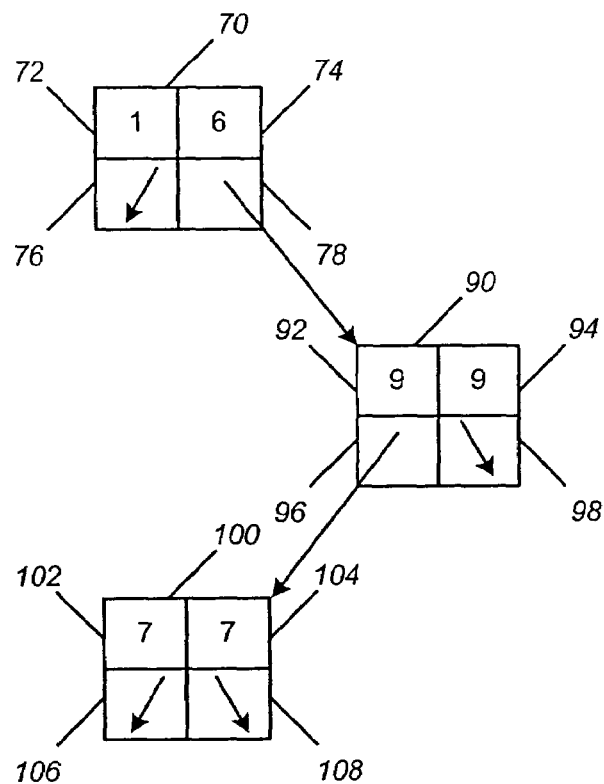

As shown in FIG. 4D, since the range of node 70 (1–4) is now contiguous with the range of node 80 (5–6), nodes 70 and 80 are "collapsed" or merged together to form a new node 70, which thereafter contains lower and upper boundary values 72 and 74, respectively, of "1" and "6." Thus, the number of nodes has decreased from four nodes to three, and the amount of memory space required to keep track of received packets has been reduced.

Figure 4E:
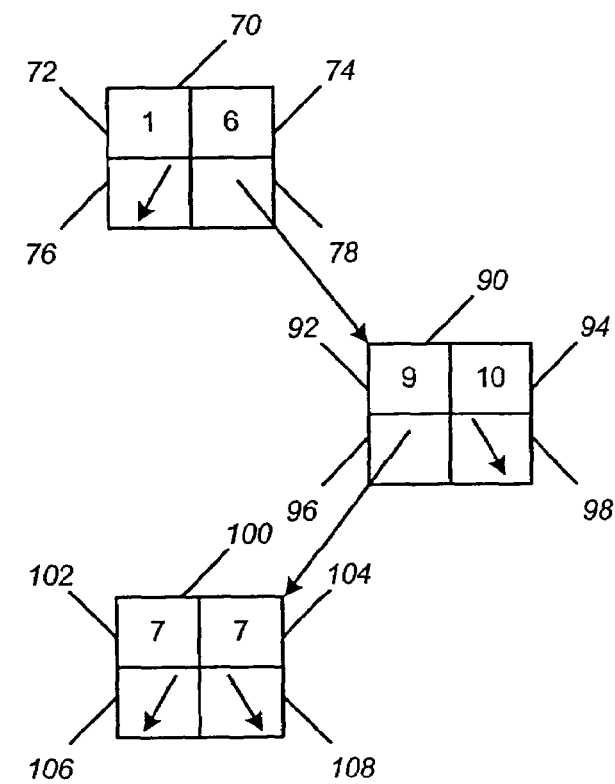

Next, a packet arrives containing a sequence number of "10." This packet also contains information in its header indicating that it is the last packet in a specified "set of data" or message. The new packet is contiguous with the range stored in node 90 and, therefore, node 90 is updated to reflect the new contiguous range of "9–10," as shown in FIG. 4E. Since this is the last packet in the set, the software/firmware executed by the receiving device determines that a packet with sequence number "8" is still missing. The fact that one or more packets are missing can be handled in various ways according to system design preferences. For example, in one embodiment, the software/firmware determines that there has been an error in transmission and generates a "transmission error" message which is sent back to the source of the data. In another embodiment, the software/firmware sends a selective negative acknowledgement "SNACK" message back to the sending device, informing the sending device that it has not received the packet with sequence number "8." In response to the SNACK message, the source device then re-transmits the requested packet. In another embodiment, a SNACK message may be sent each time a packet is received out of sequence, or at whatever times or upon whatever conditions or events desired by the system designers, operators and/or users. Techniques and protocols for generating and transmitting SNACK messages back to the source device are well known in the art.

Figure 4F:
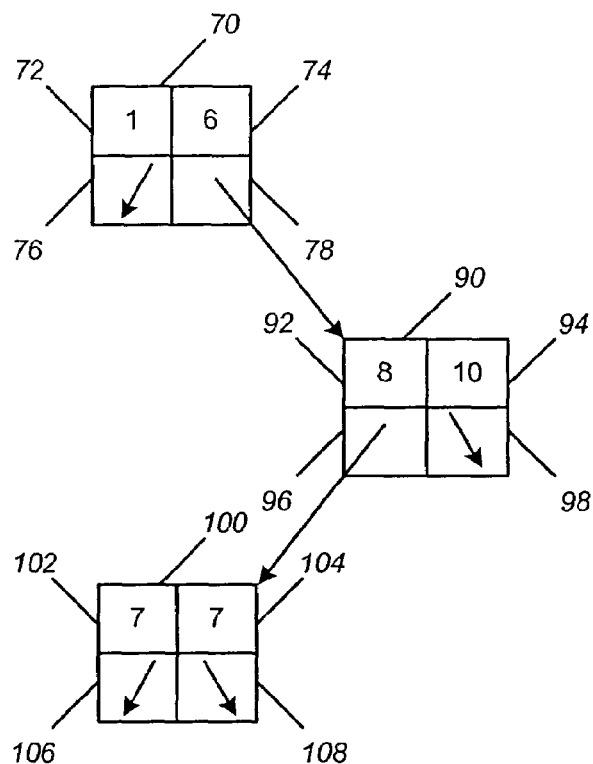
Figure 4G:
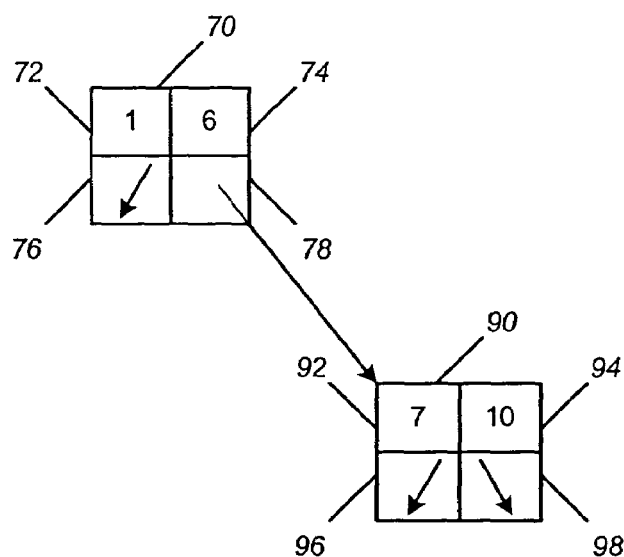
Figure 4H:
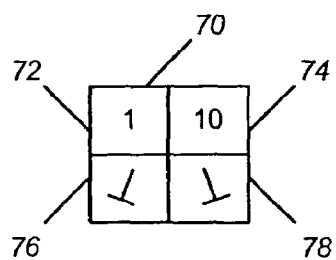

FIG. 4F illustrates the status of nodes 70, 90 and 100 of FIG. 4E, after a packet containing sequence number "8" is received by the receiving device. This new sequence number is contiguous with the range contained in node 90. Therefore, the range in node 90 is updated to represent the new contiguous range "8–10." Since the new range in node 100 ("7") is now contiguous with the range contained in node 90 ("8–10"), node 100 is merged with node 90, which then represents a new contiguous range of "7–10," as shown in FIG. 4G. Next, the process recursively determines that the range of node 70 ("1–6") is now contiguous with the new range of node 90 ("7–10") and, thereafter, merges nodes 70 and 90 together. FIG. 4H illustrates the resulting node 70, which now represents the complete set of packets with sequence numbers "1–10" within the single node 70. It is further appreciated that since there is only a single node remaining after a "last packet" has been received, the method of the present invention enables software/firmware to quickly and efficiently determine that there are no missing packets.

As described above, as new packets are received, the method and system of the present invention recursively collapses nodes that become contiguous with other nodes as a result of a new sequence number of the newly received packet. In this way, the method and system of the present invention automatically and recursively "prunes" the nodes of a binary tree data structure so as to minimize the memory requirements for keeping track of received packet sequence numbers. Furthermore, while the above embodiments are described in the context binary trees, it is understood that other well known "tree" data structures, suchs a "red-black tree" or "a Patricia tree," may be utilized in accordance with the present invention.

Figure 5:
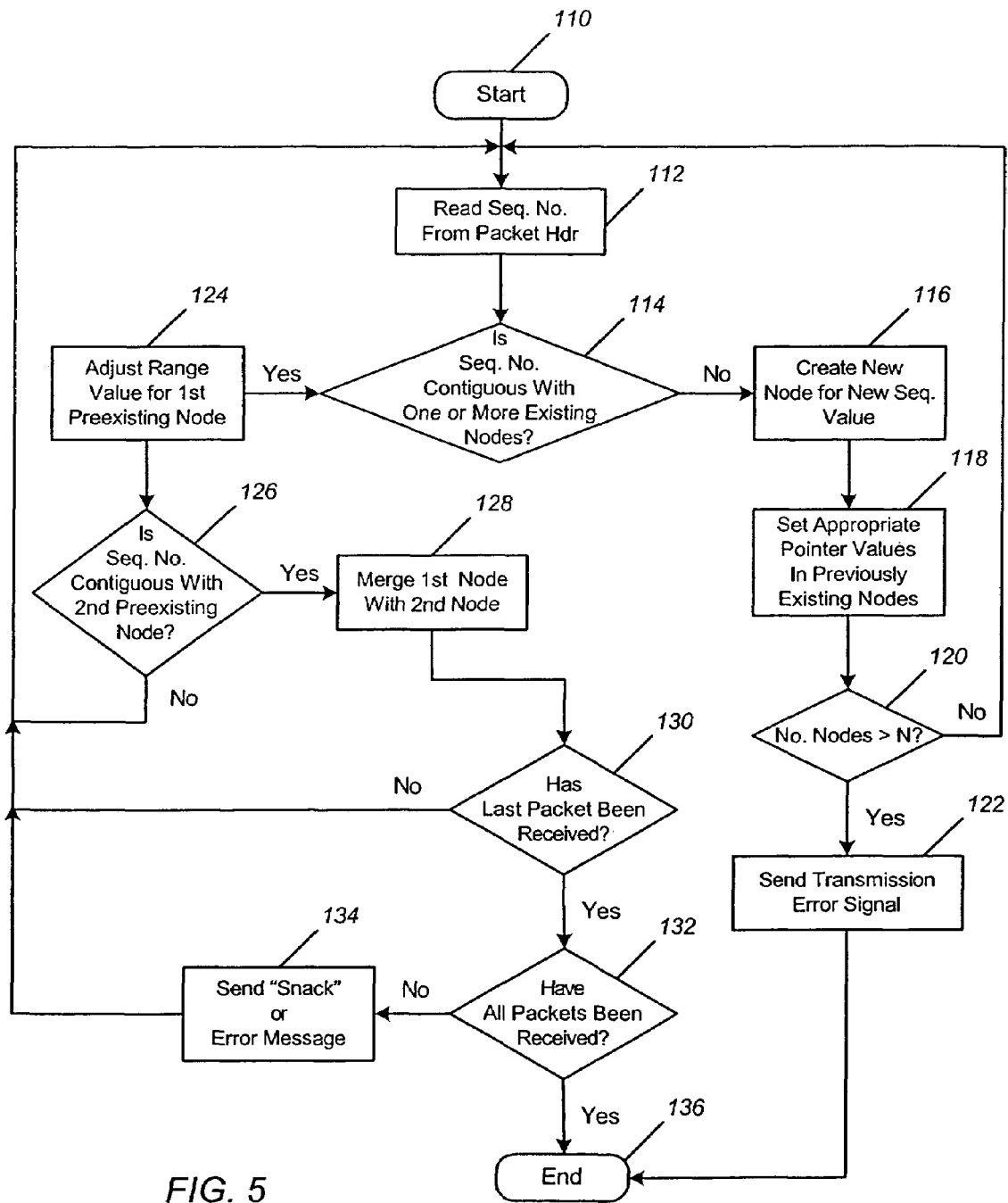
FIG. 5 illustrates a flow chart diagram of a process of data management, in accordance with one embodiment of the present invention.

FIG. 5 illustrates a flow chart diagram of a process for managing the transmission of data from a source device to a receiving device via computer network medium 26 (FIG. 1), in accordance with one embodiment of the invention. The process starts at step 110 and proceeds to step 112 where software/firmware executed by the receiving device reads a sequence number from the header portion of a received data packet. Next, at step 114, the process determines whether the sequence number is contiguous with the sequence range of one or more existing nodes of a binary tree, which stores the sequence numbers of received data packets. If the new sequence number is not contiguous with any existing sequence numbers or ranges stored by a node, at step 116, a new node of the binary tree is created which stores the new sequence number. At step 118, pointer values of existing nodes and the newly created node are updated as necessary, as discussed above with respect to FIGS. 4A–4H.

Next, at step 120, in accordance with one embodiment of the invention, the process determines whether the number of nodes created exceeds a predetermined maximum number N. The number N can be chosen and adjusted to identify when a source device is not transmitting data properly and, thereafter, abort the connection between the source device and receiving device. If the number of nodes exceeds the predetermined number N, the number of out-of-sequence packets has exceeded a desired maximum. If this is the case, the process proceeds to step 122, where the receiving device generates and sends a "transmission error" signal to the source device and terminates the connection at step 136. If the number of nodes has not exceeded N, the process returns to step 112, where a new sequence number from a new packet is read and processed. In another embodiment, at step 120, the process determines whether the connection time between the source and receiving device has exceeded a predetermined maximum duration instead of whether the number of nodes exceeds the value N.

If at step 114, the sequence number of the received packet is contiguous with a sequence number range of one or more pre-existing nodes, at step 124, the sequence number range of a "first" preexisting node is adjusted to reflect the new contiguous range that includes the new sequence number. Next, at step 126, the process determines whether the new sequence number, or the newly adjusted range of the first preexisting node, is contiguous with a "second" preexisting node. If the answer is "yes," at step 128, the first pre-existing node is merged with the second preexisting node to create a new single node that includes a new contiguous sequence number range that includes the new sequence number and the two previous contiguous ranges of the former first and second nodes. Next, at step 130, the process determines if the last packet of a data set or message has been received. If the answer is "no," the process returns to step 112 where a sequence number from a new packet is read and processed.

If the received packet is the last packet of the set, at step 132, the process determines whether all packets of the set have been received. If all packets have been received, there should be only one node that represents the complete contiguous set of sequence numbers. If there is more than one node, this means that there are one or more missing packets whose sequence numbers are not accounted for. If all packets have not been received, then at step 134, the process sends either a SNACK message a "transmission error" message back to the source device. If at step 132, it is determined that all packets have been successfully received, the process ends at step 136.

One of ordinary skill in the art will appreciate that the above descriptions of the preferred embodiments are exemplary only and that the invention may be practiced with modifications or variations of the techniques disclosed above. Those of ordinary skill in the art will know, or be able to ascertain using no more than routine experimentation, many equivalents to the specific embodiments of the invention described herein. Such modifications, variations and equivalents are contemplated to be within the spirit and scope of the present invention as set forth in the claims below.

What is claimed is:

1. A method of tracking data transmitted from a source device to a receiving device over a communication medium, comprising:
    receiving a data packet;
    reading a first sequence number from the received data packet;
    determining whether the first sequence number is contiguous with a sequence number range contained in a first preexisting node of a tree data structure, wherein the tree data structure is stored in a memory coupled to the receiving device;
    if the new sequence number is not contiguous with the sequence number range, creating a new node that contains the new sequence number;
    if the new sequence number is contiguous with the sequence number range, updating the first preexisting node such that the new sequence number becomes a new boundary value for the sequence number range contained in the first preexisting node;
    determining if the first preexisting node, after it has been updated, contains a sequence number range that is contiguous with a sequence number range of a second preexisting node; and
    if the sequence number range contained in the first preexisting node, after it has been updated, is contiguous with the sequence number range of the second preexisting node, merging the first and second preexisting nodes into a single node that represents a new contiguous range that includes the previous ranges represented by the first and second preexisting nodes prior to their merger.

2. The method of claim 1 wherein said new and first preexisting nodes each comprise:
    a lower boundary field for storing a minimum value of a contiguous range of sequence numbers;
    an upper boundary field for storing a maximum value of the contiguous range;
    a left pointer field for storing a value that identifies an adjacent node containing a lower contiguous range of sequence numbers; and
    a right pointer field for storing a value that identifies another adjacent node containing a higher contiguous range of sequence numbers.

3. The method of claim 1, further comprising:
    determining if said data packet is a last packet of a data set;
    if said data packet is a last packet of a data set, determining whether all packets have been received; and
    wherein if the data packet is the last packet and all packets of the data set have not been received, sending a SNACK message to said source device, indicating which packets are missing.

4. The method of claim 1 wherein said communication medium is a computer network communications medium and said sequence numbers are iSCSI sequence numbers.

5. The method of claim 1 further comprising:
    determining whether the number of nodes of said tree data structure exceeds a predetermined maximum value N; and
    terminating a communication channel between said source device and said receiving device if the number of nodes exceeds N.

6. A method of tracking data transmitted from a source device to a receiving device over a communication medium, comprising:
- receiving a data packet
- reading a new sequence number from the received data packet;
- determining whether the new sequence number is contiguous with a sequence number range contained in a first preexisting node of a binary tree stored in a memory coupled to the receiving device;
- if the new sequence number is not contiguous with the sequence number range, creating a new node that contains the new sequence number;
- if the new sequence number is contiguous with the sequence number range, updating the first preexisting node such that the new sequence number becomes a new boundary value for said sequence number range contained in the first preexisting node;
- determining if the first preexisting node, after it has been updated, contains a sequence number range that is contiguous with a sequence number range of a second preexisting node;
- if the sequence number range of the first preexisting node, after it has been updated, is contiguous with the sequence number range of the second preexisting node, merging the first and second preexisting nodes into a single node that contains a new contiguous range that includes the previous ranges represented by the first and second preexisting nodes prior to their merger;
- determining whether the number of nodes of said tree data structure exceeds a predetermined maximum value N; and
- terminating a communication channel between said source device and said receiving device if the number of nodes exceeds N.

7. The method of claim 6 wherein said new node and said first and second preexisting nodes each comprise:
- a lower boundary field for storing a minimum value of a contiguous range of sequence numbers;
- an upper boundary field for storing a maximum value of the contiguous range;
- a left pointer field for storing a value that identifies an adjacent node containing a lower contiguous range of sequence numbers; and
- a right pointer field for storing a value that identifies another adjacent node containing a higher contiguous range of sequence numbers.

8. The method of claim 7 further comprising:
- determining if a last packet of a data set has been received;
- if the last packet has been received, determining whether all packets have been received; and
- wherein if the last packet has been received and all packets have not been received, sending a SNACK message to said source device, indicating which packets are missing.

9. The method of claim 6 wherein said communication medium is a computer network communications medium and said sequence numbers are iSCSI sequence numbers.

10. A computer-based system for tracking data transmitted from a source device to a receiving device over a communication medium, comprising:
- means for reading a new sequence number from a newly received data packet;
- means for determining whether the new sequence number is contiguous with a sequence number range contained in a first preexisting node of a tree data structure stored in a memory coupled to the receiving device;
- means for creating a new node that contains the new sequence number if the new sequence number is not contiguous with the previous sequence number;
- means for updating the first preexisting node such that the new sequence number becomes a new boundary value for the sequence number range contained in preexisting node if the new sequence number is contiguous with the sequence number range;
- means for determining if the first preexisting node, after it has been updated, contains a sequence number range that is contiguous with a sequence number range of a second preexisting node; and
- means for merging the first and second preexisting nodes into a single node that represents a new contiguous range that includes the previous ranges represented by the first and second preexisting nodes prior to their merger, if the sequence number range of the first preexisting node, after it has been updated, is contiguous with the sequence number range of the second preexisting node.

11. The system of claim 10 wherein said new and first preexisting nodes each comprise:
- a lower boundary field for storing a minimum value of a contiguous range of sequence numbers;
- an upper boundary field for storing a maximum value of the contiguous range;
- a left pointer field for storing a value that identifies an adjacent node containing a lower contiguous range of sequence numbers; and
- a right pointer field for storing a value that identifies another adjacent node containing a higher contiguous range of sequence numbers.

12. The system of claim 10, further comprising:
- means for determining if a last packet of a data set has been received;
- means for determining whether all packets have been received, if the last packet has been received; and
- means for sending a SNACK message to said source device, indicating which packets are missing, if it is determined that the last packet has been received and all packets have not been received.

13. The system of claim 10 wherein said communication medium is a computer network communications medium and said sequence numbers are iSCSI sequence numbers.

14. The system of claim 10 further comprising:
- means for determining whether the number of nodes of said tree data structure exceeds a predetermined maximum value N; and
- means for terminating a communication channel between said source device and said receiving device if the number of nodes exceeds N.

15. A system for tracking data transmitted from a source device to a receiving device over a communication medium, comprising:
- means for receiving a data packet
- means for reading a new sequence number from the received data packet;
- means for determining whether the new sequence number is contiguous with a sequence number range contained in a first preexisting node of a tree data structure stored in a memory coupled to the receiving device;
- means for creating a new node that contains the new sequence number, if the new sequence number is not contiguous with the sequence number range;

means for updating the first preexisting node such that the new sequence number becomes a new boundary value for said sequence number range contained in the first preexisting node, if the new sequence number is contiguous with the sequence number range;

means for determining if the first preexisting node, after it has been updated, contains a sequence number range that is contiguous with a sequence number range of a second preexisting node;

means for merging the first and second preexisting nodes into a single node that contains a new contiguous range, which includes the previous ranges represented by the first and second preexisting nodes prior to their merger, if the sequence number range of the first preexisting node, after it has been updated, is contiguous with the sequence number range of the second preexisting node;

means for determining whether the number of nodes of said tree data structure exceeds a predetermined maximum value N; and means for terminating a communication channel between said source device and said receiving device if the number of nodes exceeds N.

16. The system of claim 15 wherein said new node and said first and second preexisting nodes each comprise:

a lower boundary field for storing a minimum value of a contiguous range of sequence numbers;

an upper boundary field for storing a maximum value of the contiguous range;

a left pointer field for storing a value that identifies an adjacent node containing a lower contiguous range of sequence numbers; and a right pointer field for storing a value that identifies another adjacent node containing a higher contiguous range of sequence numbers.

17. The system of claim 15 further comprising:

means for determining if a last packet of a data set has been received;

means for determining whether all packets have been received; and means for sending a SNACK message to said source device, indicating which packets are missing, if the last packet has been received and all packets have not been received.

18. The system of claim 15 wherein said communication medium is a computer network communications medium and said sequence numbers are iSCSI sequence numbers.

19. A computer readable medium having stored thereon a data structure having a plurality of nodes, a first node comprising:

a lower boundary field for storing a minimum value of a first contiguous range of numbers corresponding to the node;

an upper boundary field for storing a maximum value of the first contiguous range;

a left pointer field for storing a value that identifies a left node with lower and upper boundary fields for storing minimum and maximum values, respectively, of a lower contiguous range; and a right pointer field for storing a value that identifies a right node with lower and upper boundary fields for storing minimum and maximum values, respectively, of a higher contiguous range;

wherein the first node is merged with its corresponding left node if the first contiguous range is contiguous with the lower contiguous range, and the first node is merged with its corresponding right node if the first continuous range is contiguous with the higher contiguous range such that at least one of said lower and upper boundary fields of the first node is updated so as to reflect a new expanded contiguous range.

* * * * *